(12) United States Patent
Reynolds et al.

(10) Patent No.: US 12,103,378 B2
(45) Date of Patent: Oct. 1, 2024

(54) DUAL HEAT PATH BODY

(71) Applicant: Austin Engineering USA Services, Inc., Casper, WY (US)

(72) Inventors: Frederick J. Reynolds, Casper, WY (US); Wayne D. Soule, Casper, WY (US)

(73) Assignee: Austin Engineering USA Services, Inc., Mills, WY (US)

( * ) Notice: Subject to any disclaimer, the term of this patent is extended or adjusted under 35 U.S.C. 154(b) by 277 days.

(21) Appl. No.: 17/738,949

(22) Filed: May 6, 2022

(65) Prior Publication Data
US 2022/0355660 A1 Nov. 10, 2022

Related U.S. Application Data

(60) Provisional application No. 63/186,460, filed on May 10, 2021.

(51) Int. Cl.
*B60K 13/04* (2006.01)
*B60K 13/06* (2006.01)
*B60P 1/28* (2006.01)

(52) U.S. Cl.
CPC ............. *B60K 13/04* (2013.01); *B60K 13/06* (2013.01); *B60P 1/28* (2013.01)

(58) Field of Classification Search
CPC . B60K 13/04; B60K 13/06; B60P 1/28; B60P 1/286; B60Y 2200/142
See application file for complete search history.

(56) References Cited

U.S. PATENT DOCUMENTS

| | | | |
|---|---|---|---|
| 3,472,548 A | 10/1969 | Comisac | |
| 4,002,370 A * | 1/1977 | Blackmore | B60P 1/60 137/625.5 |
| 2008/0066886 A1* | 3/2008 | Mabuchi | F28D 7/106 165/67 |

FOREIGN PATENT DOCUMENTS

CN 203920530 U * 11/2014 ............. B60P 1/286

* cited by examiner

*Primary Examiner* — Jacob M Amick
*Assistant Examiner* — Charles J Brauch
(74) *Attorney, Agent, or Firm* — Colter Jennings

(57) ABSTRACT

A truck body has passageways formed therein to pass hot vehicle exhaust through the front wall, the side walls, and the floor of the body to heat the body and assist with removal of mining material from the body during dumping. The body has forward or fore exhaust ports and more rearward or aft exhaust ports for the exhaust, so that the body may be mounted on a truck chassis that has fore terminating exhaust pipes or on a truck chassis that has aft terminating exhaust pipes.

15 Claims, 15 Drawing Sheets

DUAL HEAT PATH BODY

BACKGROUND

This application claims priority based on U.S. Provisional Patent Application Ser. No. 63/186,460 filed May 10, 2021 and titled "Dual Heat Path Body," the entire disclosure of which is incorporated herein by this reference.

This disclosure relates to an improved truck body for mounting to a mining truck chassis, and more particularly to a truck body that is able to provide exhaust heating to the front wall, transitions, and floor of the body when mounted on mining truck chassis having a forward or fore exhaust port (typically located near the front wall of the body) or an aft exhaust port (typically located near the pivot area of the body).

Mining trucks used in large-scale mining operations move ore and other materials from a dig site to a processing or storage area. The material is deposited into the truck body and the truck drives to a dumping area to unload the material. However, as shown in FIG. 1, at times the combination of cold and other factors (such as moisture) can cause a significant portion of the material 10 to remain in a truck body 12 after the dumping. This material typically remains against the front wall 28, transitions 16, and floor 18 of the body. If such material is not released during the dumping process, the mining truck ends up taking that material back to the digging site, where the body is again filled with material, but not as much as might have been loaded had the material released when dumping.

As depicted in FIG. 1, the proportion of the entire load remaining in the truck body 12 may seem small. However, current truck bodies are capable of moving in excess of 400 tons of ore, overfill, and other materials, per load. Because these truck bodies are so large, the material 10 stuck to the body (and not dumped) can weigh several tons. If such material is not released during the dumping process, the mining truck returns that material to the digging site, where the body is again filled with material, but not as much as might have been loaded had the prior material released when dumping. Thus, the failure of the load to drop at the dumping area can significantly increase the costs and time necessary to move the material. Hence, the stickiness of the material can significantly reduce efficiency.

Various methods have been developed to heat the floor and the front and side walls of the truck bodies. Often, this involves passing the hot vehicle exhaust through passageways mounted on or formed into the walls and floor of the body. This heat warms the truck body along the path of the passages, and the warmer truck body reduces or even largely eliminates the amount of material that remains stuck to the truck body after dumping. The result is that several tons of material is not left in the truck body after the dumping.

Typically, the exhaust pipes of truck chassis have been designed to accommodate this warming process. However, some truck chassis have exhaust pipes that end in a forward or fore location, such as proximate the front wall of the truck body, and other chassis have exhaust pipes that end in a more rearward or aft location, such as proximate the truck body pivot point (an area generally in the middle of the truck body about which the front of the truck body rotates to dump the load). FIGS. 2A and 2B depict close-up partial views of a truck body with the exhaust pipes 20 located fore, in this case, near the front of a truck body, but in this case the exhaust pipes exit near the rear of the floor 18 of the truck body. In FIG. 2A, the truck body is lifted slightly up, off of the heat inlets 24 that will ultimately extend into the body. In FIG. 2B, the truck chassis heat flange 29 is in full contact with the heat inlets, thus completing the heat path from the chassis to the body. FIG. 3 depicts a current truck body with fore exhaust pipes 20 located at the front of the truck body 12, but in this case adjacent the front wall 28 of the body. FIG. 4 depicts a current truck body with aft exhaust outputs 30, in this case located at or near the pivot point 32 of the body.

During mining operations, truck bodies receive and absorb a tremendous amount of wear and tear. As a result, they occasionally need to be taken off the truck chassis to be repaired or replaced. When that must be done, the mine typically prefers to mount another truck body to the same chassis, to keep the mining truck in operation. As of result of these different exhaust pipe locations, if a truck body needs to be replaced, the replacement body must be designed to accommodate the exhaust pipe placement. Therefore, different truck chassis require different truck bodies, or an extensive modification to the body, thereby increasing the costs of mine operations.

SUMMARY

The present disclosure provides a truck body that overcomes many of the shortfalls of prior designs. In particular, embodiments of the present truck body may be mounted on both fore exhaust and aft exhaust styles of truck chassis. That is, the present body may be mounted on a chassis with an aft exhaust pipe or a chassis with a forward or fore exhaust pipe. The result is a truck body with flexibility as to the design of truck chassis, reducing or eliminating the need to have different bodies for different chassis exhaust pipe designs.

The present truck body includes fore exhaust entrance ports, such as along the front wall of the body. These ports are located so as to permit the exhaust pipes from a chassis having a fore exhaust pipe design to connect to exhaust passageways that have been formed in, or mounted to, the fore portion of the body, such as along the floor and front and side walls of the body. When the present truck body is mounted on such a chassis, the exhaust fumes will enter those passageways and pass through, thereby heating the front and side walls and thus assisting with removing mining material from the body during dumping.

The present truck body also includes aft exhaust ports, such as those located at the pivot point of the chassis, typically adjacent the floor of the body. These ports are located so as to permit the exhaust pipes from a chassis having an aft exhaust pipe design to connect to the passageways formed in the floor and front and side walls of the body. When the present truck body is mounted on such a chassis, the exhaust fumes will enter those passageways at the aft location and pass through the passageways, thereby heating the floor and the front and side walls and thus assisting with removal of mining material from the body during dumping.

BRIEF DESCRIPTION OF THE DRAWINGS

Other features and advantages of the present disclosure will be apparent from reference to the following Detailed Description taken in conjunction with the accompanying Drawings, in which.

DETAILED DESCRIPTION

Figure 1:
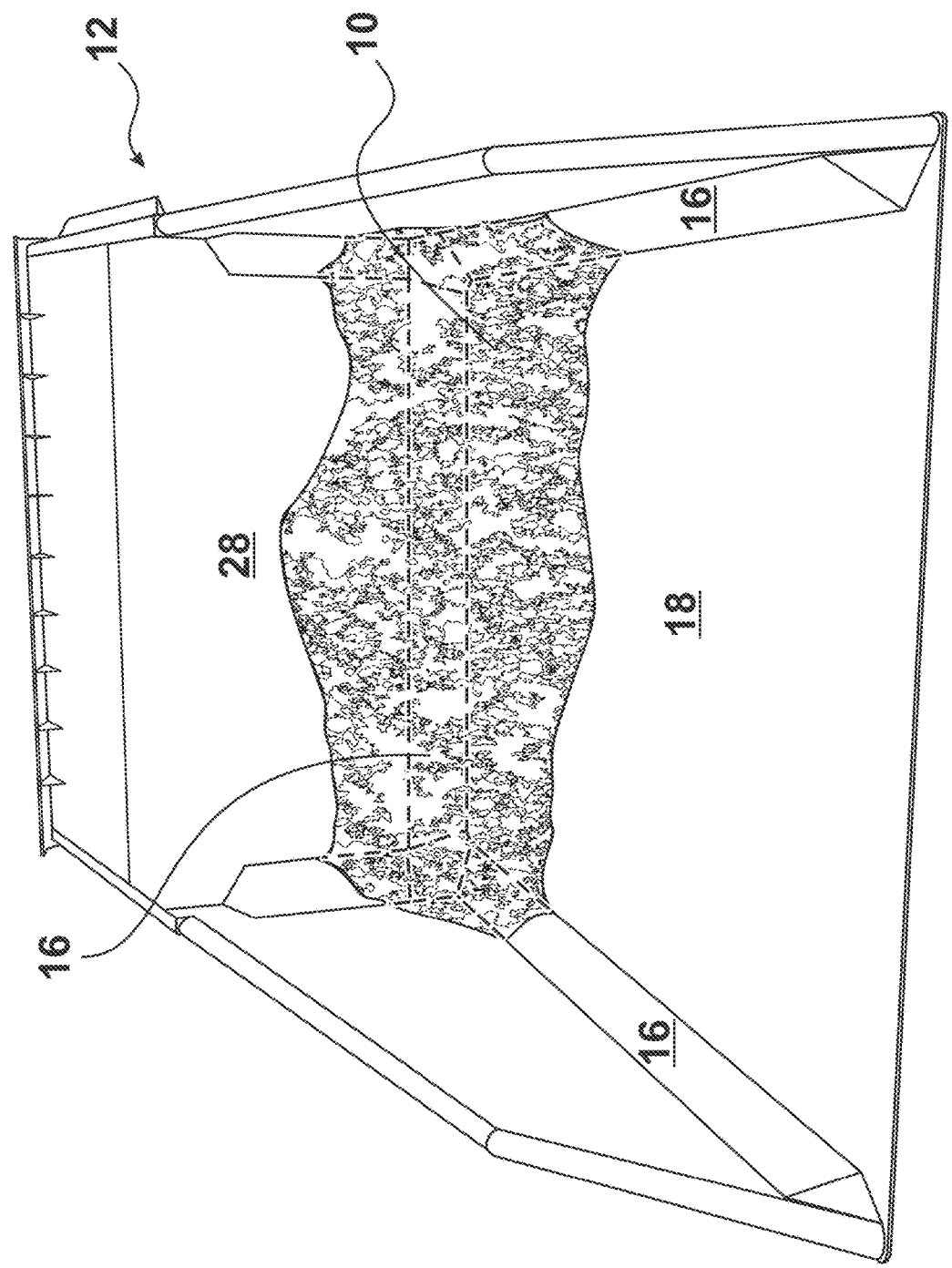
FIG. 1 is a perspective view of a truck body having material remaining in the body after dumping.
Figure 2A:
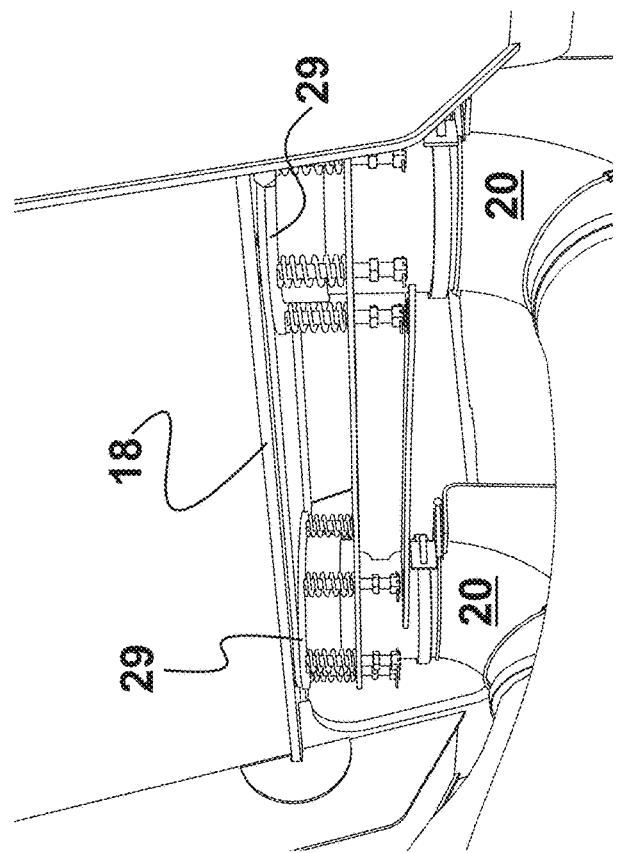
FIG. 2A is a perspective view of a truck body with forward exhaust pipes, depicting the truck body lifted above the heat inlets.
Figure 2B:
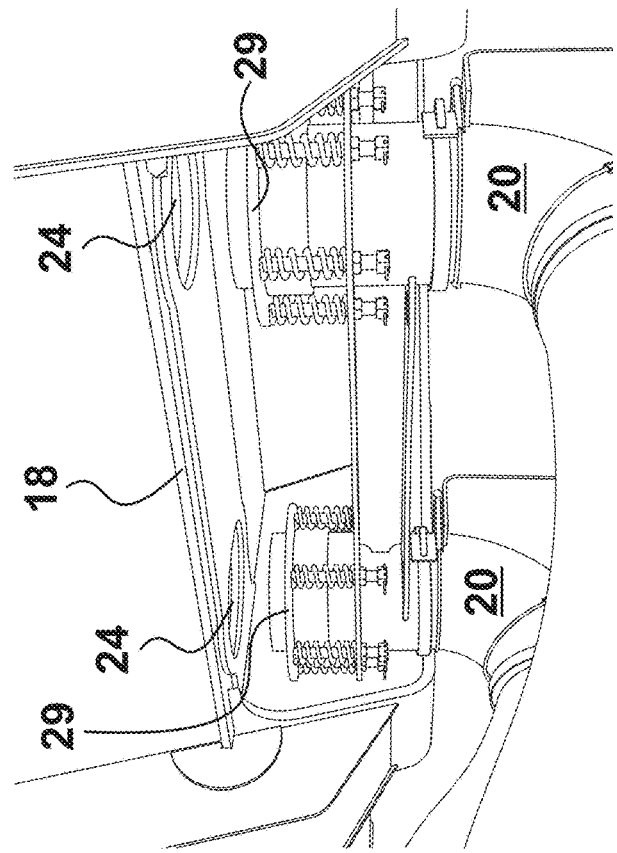
FIG. 2B is a perspective view of the truck body of FIG. 2A depicting the truck chassis heat flange in full contact with the heat input port, thus completing the heat path from the chassis to the body.
Figure 3:
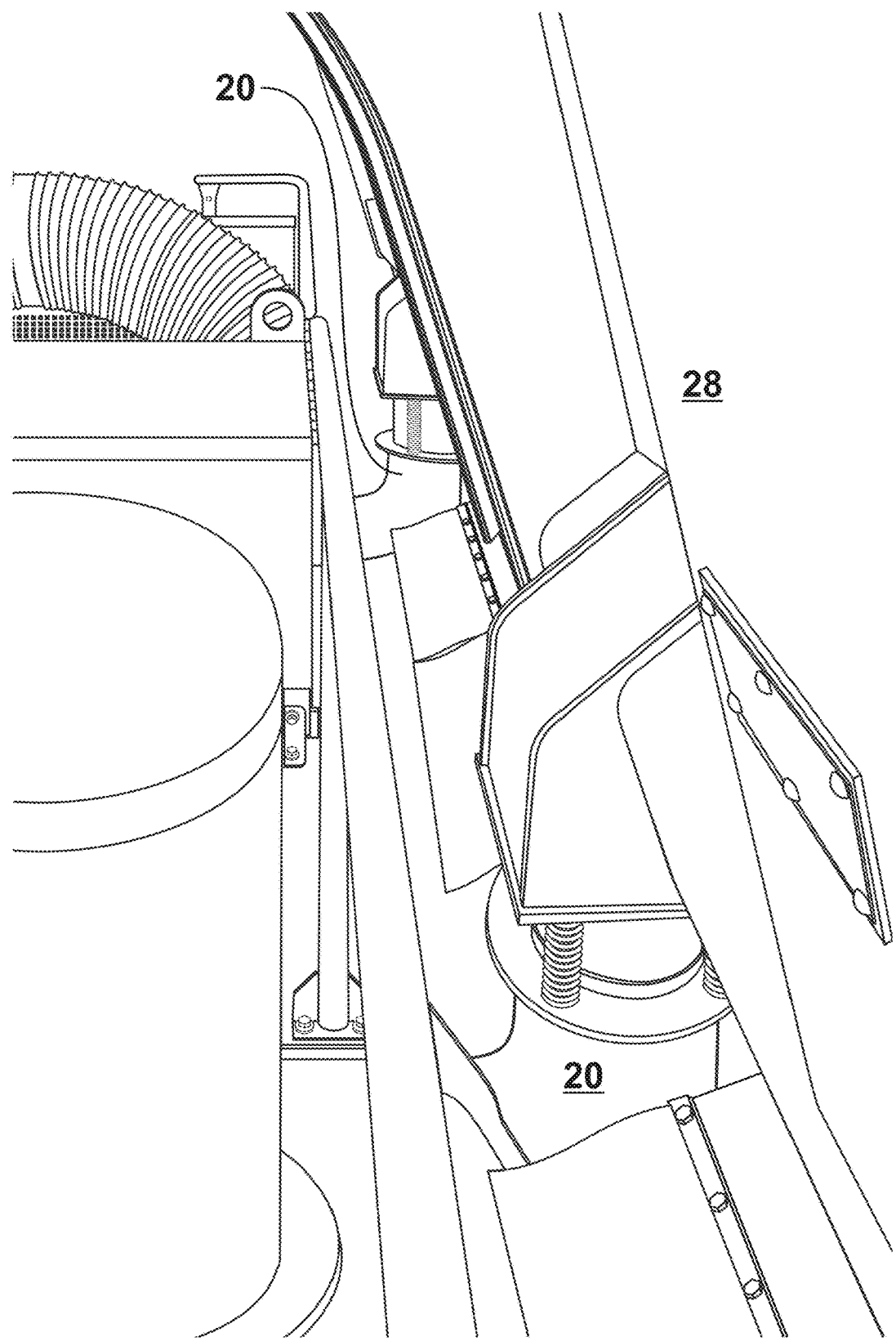
FIG. 3 is a perspective view of a truck body with fore exhaust pipes located at the front of the truck body, but in this case adjacent the front wall the body.
Figure 4:
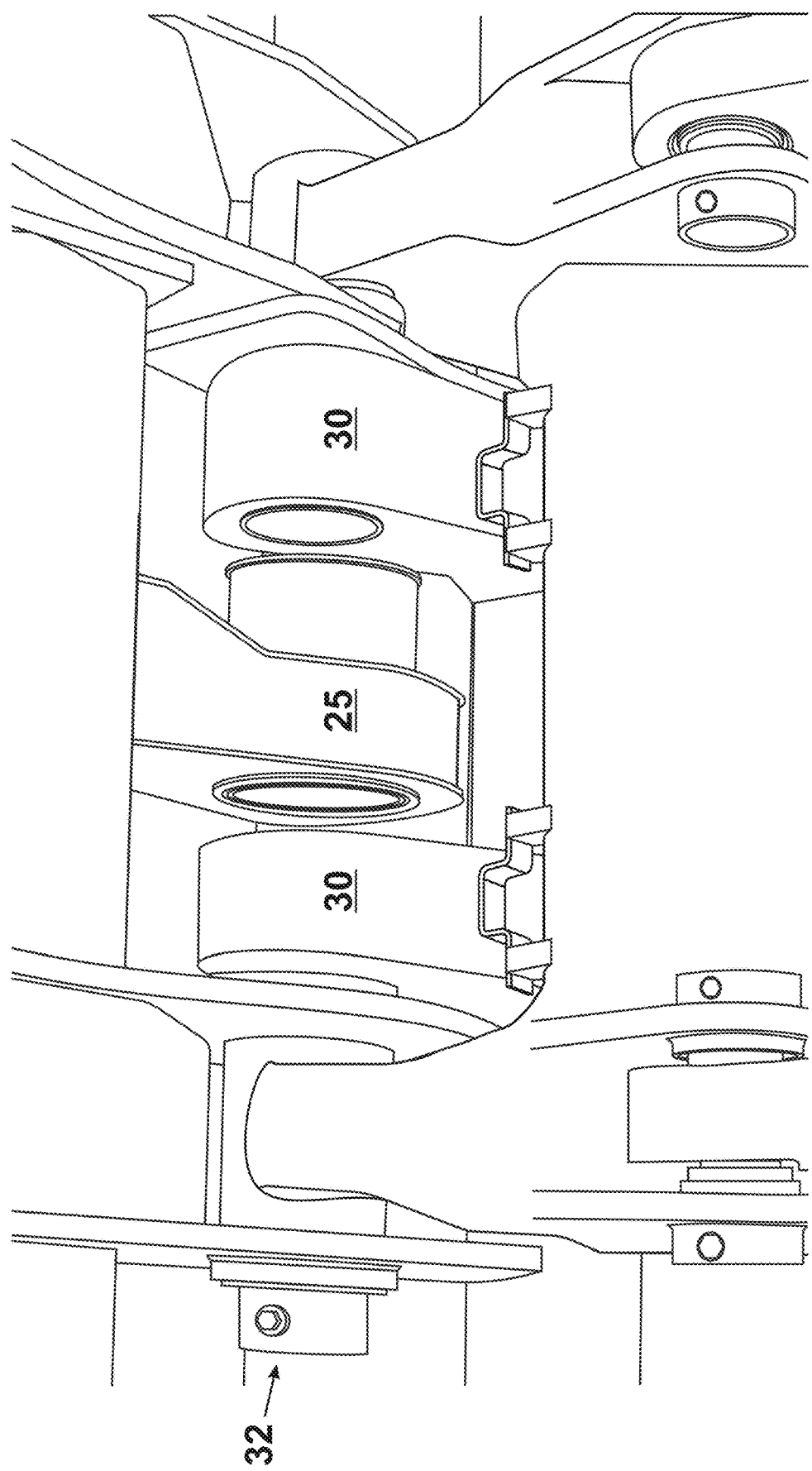
FIG. 4 is a perspective view of a truck body with aft exhaust pipes located at or near the pivot point of the body.

According to the present disclosure, a mining truck body includes exhaust entrance ports and passageways that accommodate both fore termination exhaust pipes and aft termination exhaust pipes. Generally referring to FIGS. 5-11, the truck body 12 comprises passageways 40 arranged with at least first and second passageways, each respectively extending from at least one port 26, in the front wall 28 of the truck body 12, down the front wall 28 and outwardly along the front wall 28 to their respective sidewalls 34A and 34B. In the front wall 28 there may be a single port 26 for both the at least first and second passageways, or one port 26 corresponding to each of the first and second passageways. The at least first and second passageways continue along the sides of the truck body 12 terminating at corresponding side ports 31 and 31A formed in both sides of the truck body. The passageways 40 also optionally comprise at least one lateral passageway extending across an aft portion of the truck body 12, connecting the sidewall portions of the first and second passageways. The at least one lateral passageway may be smaller in cross-sectional area than the first and second passageways. The at least one lateral passageway comprises an aft port 25 at its midsection, on the underside of the truck body 12. As shown in the drawings and described below, third and fourth lateral passageways are provided and are spaced apart from each other, and are in fluid communication with each other at the midsection where the port or ports 25 are located.

Figure 8:
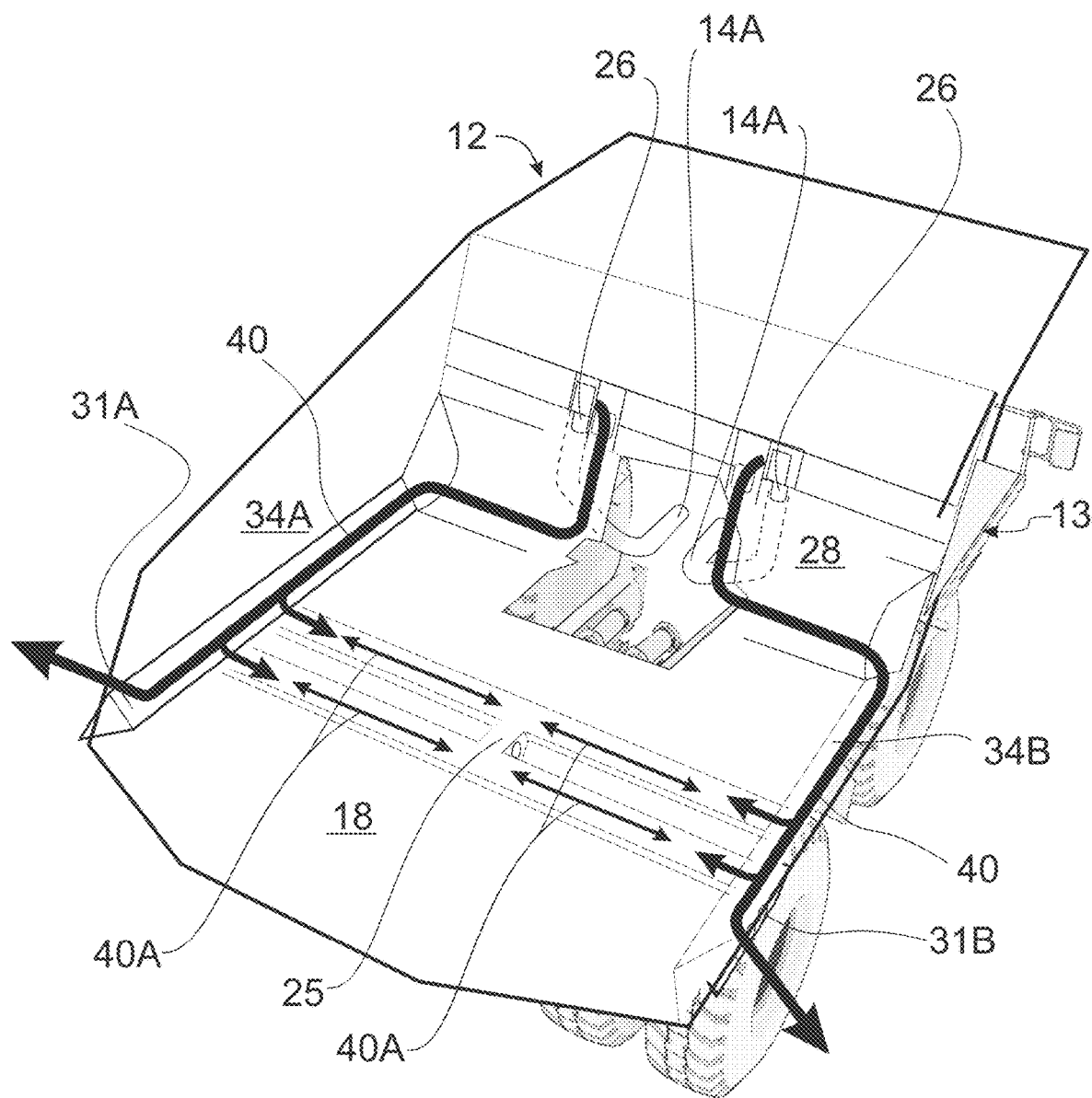
FIG. 8 is a perspective view of a truck body, a portion of which is shown as see-through, according to one embodiment of the present disclosure, the body shown mounted on a truck chassis having forward or fore exhaust pipes that terminate proximate the front wall of the body.

Depending on the truck chassis on which the truck body 12 is mounted, the ports may be closed off or act as inlets or outlets for exhaust. For example, in the example of FIG. 5, a truck chassis has aft terminating exhaust pipes. Consequently the port or ports 25 function as exhaust inputs, and the port or ports 26 in the front wall 28 are closed off. In the example of FIG. 8, when the truck chassis has fore terminating exhaust pipes, the port or ports 25 are either closed off or are left open to function as exhaust outlets. Thus, a single truck body comprises a plurality of ports in the front wall, sidewalls, and underside of the aft midsection, interconnected by passageways permitting selective exhaust flow between the fore and aft of the truck body to accommodate different truck chassis configurations. The drawings depict only one example of the configuration and number of passageways; those skilled in the art will understand that the passageways interconnecting the ports may take different paths within the truck body.

Figure 5:
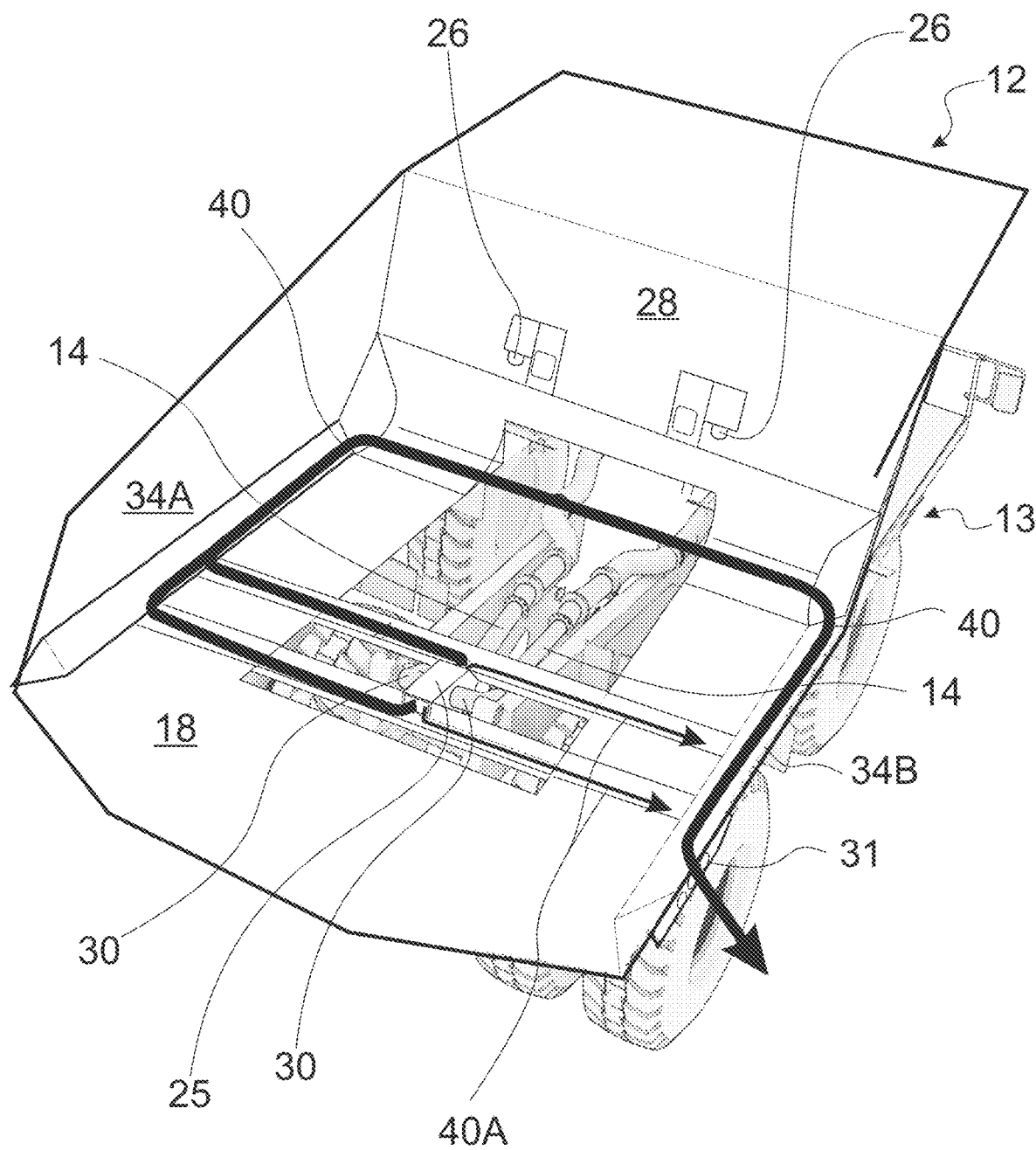
FIG. 5 is a perspective view of a truck body, a portion of which is shown as see-through, according to one embodiment of the present disclosure, the body shown mounted on a truck chassis having aft exhaust pipes that terminate proximate the pivot point of the chassis.

FIG. 5 depicts a perspective view of a truck body 12 according to an embodiment of the present disclosure mounted on a truck chassis 13 having two aft terminating exhaust pipes. As depicted therein, in this embodiment the chassis has exhaust pipes 14 that terminate proximate the pivot point of the chassis, that is, in the aft portion of the body. Aft ports 25 in the body receive the exhaust fumes from the truck engine and pass that heated exhaust into passageways 40. Thus, in this example the ports 25 function as inputs or inlets into the passageways 40.

As shown in FIG. 5, the passageways 40 cause the exhaust fumes to flow from the middle of the body floor 18 to one of the sidewalls 34A of that body, and then forward to the front wall 28. From there, the passageways conduct the heated fumes across the base of the front wall and then down the other side wall 34B to a port 31 functioning as an output or exhaust port formed in the truck body side wall. As a result, in use, the exhaust fumes will heat the sides and front wall transitional area of the body. According to an optional embodiment, the passageways 40 include smaller passageways 40A that allow a portion of the exhaust fumes to pass from the aft ports 25 directly to the second side wall and out the output port 31. Flow through the passageways 40 leading to ports 26 is not shown in FIG. 5, because in the embodiment of FIG. 5 the ports 26 are closed off.

Figure 6:
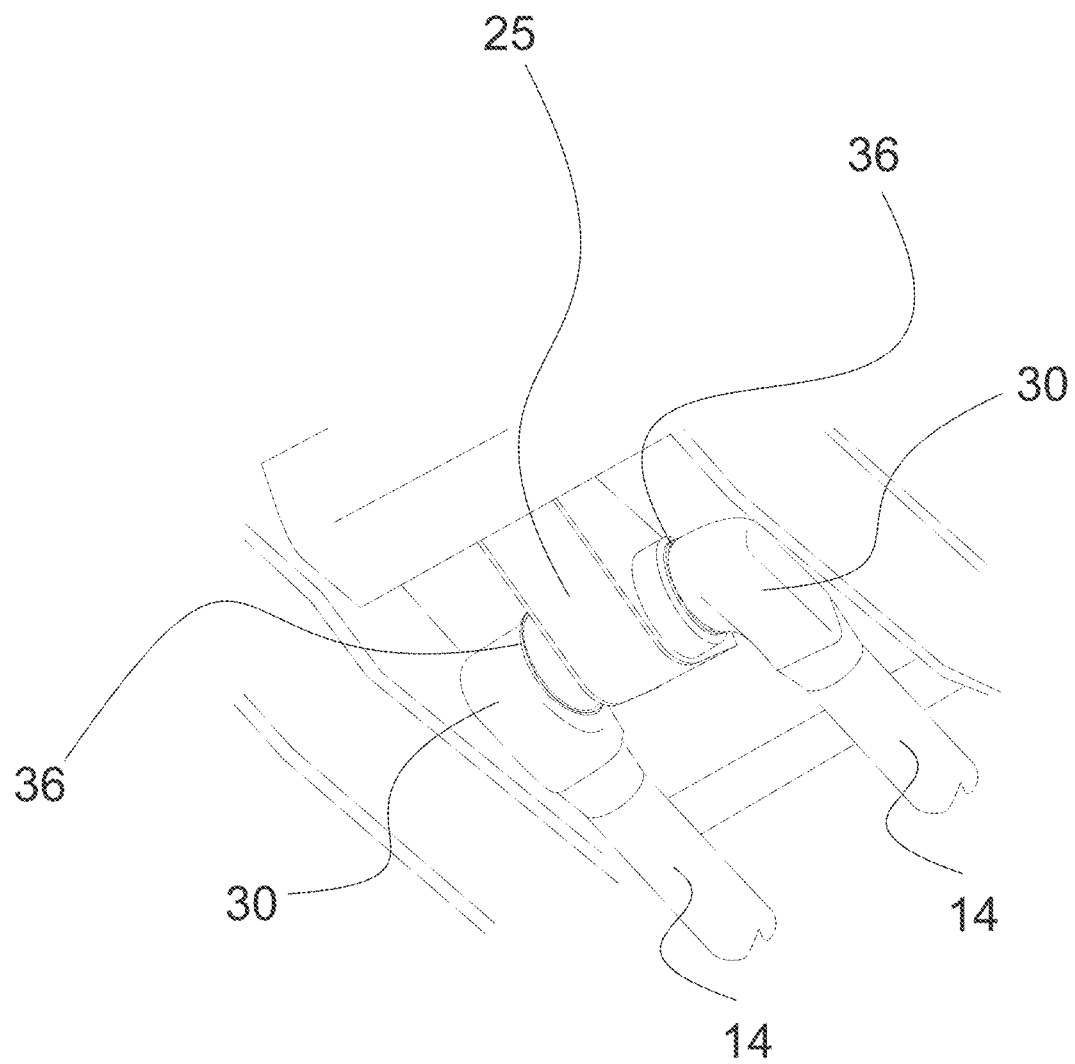
FIG. 6 is a close-up perspective view of the aft exhaust pipes and pivot area ports of the truck body of FIG. 1.

FIG. 6 depicts a bottom close-up view of aft exhaust outputs 30 of the truck chassis that are connected to the end of the exhaust pipes 14 and to the aft inputs on the truck body 12, as in the embodiment of FIG. 5. The exhaust pipes 14 bring the exhaust into close contact with the ports 25, by curving into each side of the ports. Bellows 36 connect the exhaust outputs 30 to the aft ports 25, thereby directing the exhaust fumes to the passageways 40.

Figure 7:
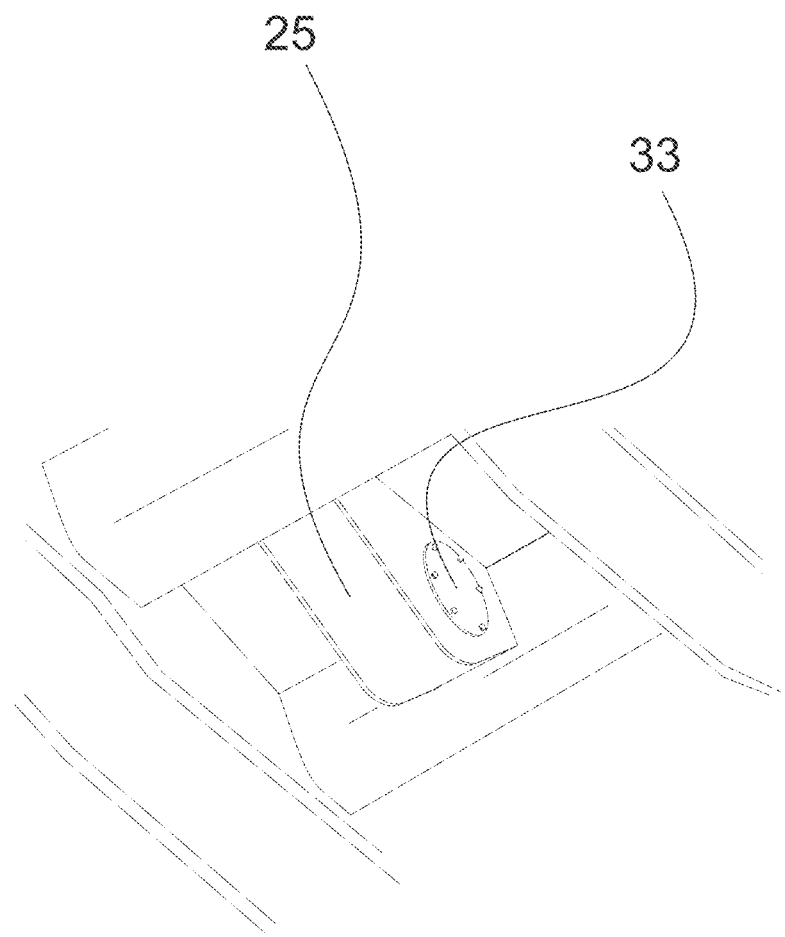
FIG. 7 is a close-up perspective view of the aft ports of the truck body of FIG. 5 with the ports closed off.

FIG. 7 depicts a bottom close-up view of the pivot area of the truck body 12 in another embodiment. In this figure, exhaust pipes 14 are not shown, as this figure shows this part of the truck body 12 when the truck body is mounted on a chassis 13 having forward or fore exhaust pipes that terminate near the front wall of the truck body, as in the example of FIG. 8. When used on such a chassis 13, plates 33 are typically affixed to the aft ports 25 to keep the exhaust fumes in the passageways 40. However, as discussed below (in particular regarding FIG. 12), in some situations, the plates 33 might not be affixed, thereby permitting exhaust fumes to pass through the passageways along the floor 18 of the truck body 12 and exit through the aft ports 25, which thus function as outlets or exhaust ports.

FIG. 8 depicts a perspective view of the truck body 12 according to the embodiment depicted in the Figures when the body is mounted on a truck chassis 13 having two fore terminating exhaust pipes 14A. According to this embodiment, the truck body 12 has ports 26 that function as fore exhaust ports to pass engine exhaust through the front wall 28 of the body and into the passageways 40, again drawn with thick lines having arrows showing the directions of flow of the exhaust fumes through the truck body. In the embodiment depicted in FIG. 8, the passageways split the fumes into two flows, which exhaust flows direct the fumes down the front wall and then outwardly to the respective sidewalls 34A and 34B. The warm exhaust fumes flow out of the side ports 31 and 31A formed in both sides of the truck body. Note that in this embodiment, the portion of the passageways 40A extending between the side walls 34A and 34B allow a portion of the exhaust fumes to pass through, and thereby heat, the truck body floor 18 in those areas as shown by the lighter-weight double-arrowed lines across the floor of the body in FIG. 8. In some embodiments, the aft ports 25 are left open to the atmosphere when the body is mounted on a fore terminating exhaust pipe chassis, permitting a portion of the exhaust fumes to flow beneath the middle section of the floor 18 and exit through the aft ports 25 near the pivot area of the body.

The embodiments of FIGS. 5 and 8 depict the same or a similar truck body mounted on two different types of truck chassis 13, that is, aft exhaust pipes terminating and fore exhaust pipes terminating chassis, respectively. In fact, the embodiment depicted in FIG. 5 typically has the two side or bottom ports 31A and 31B, but when the body 10 is mounted to a chassis having aft exhaust pipes, one of the side ports 31A or 31B is often closed off, thereby allowing the fumes to circulate about the truck body rather than simply flow out the nearest port 31A or 31B.

Figure 9:
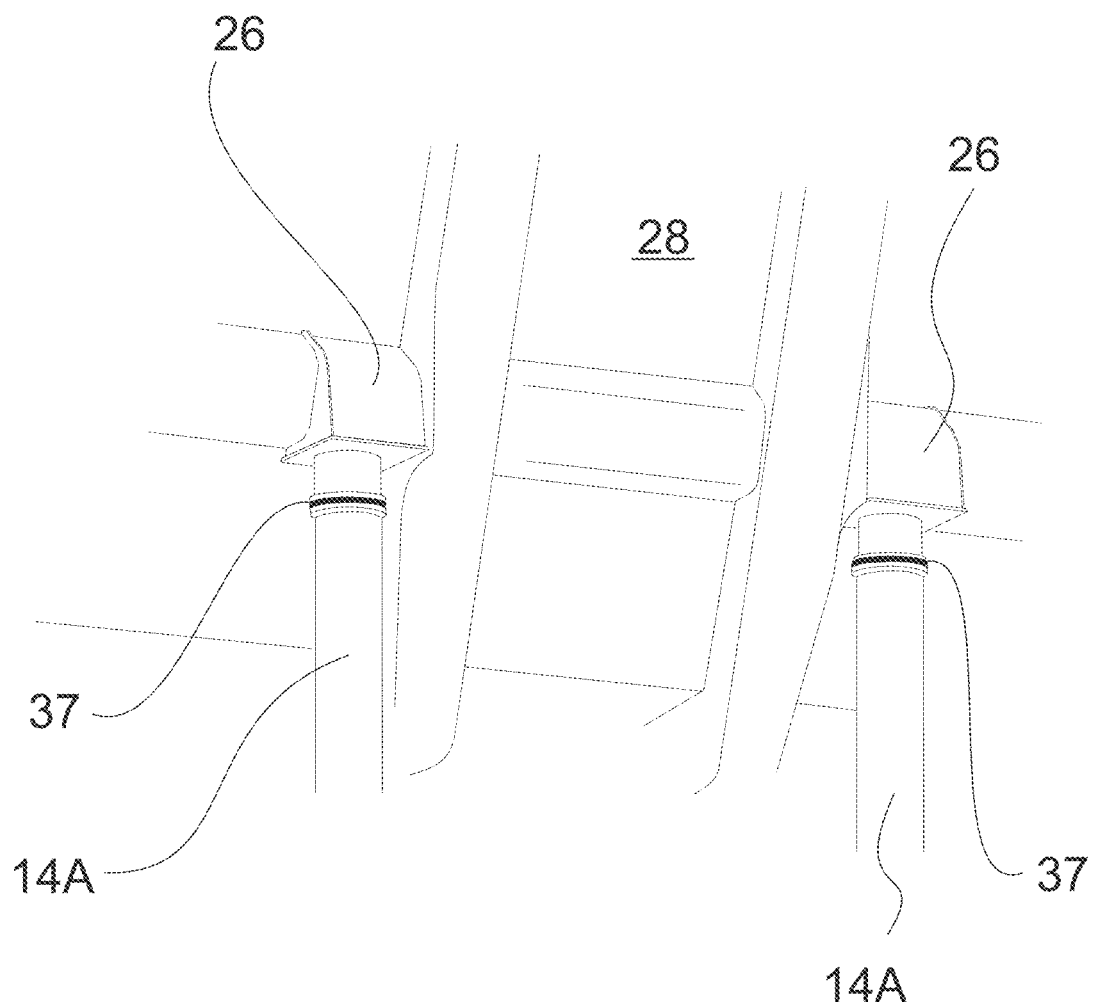
FIG. 9 is a close-up perspective view of the fore exhaust pipes and fore input ports of the truck body of FIG. 8.

FIG. 9 depicts a close-up perspective view of the front wall 28 of the truck body 12 when fore exhaust ports 26 are in use with fore exhaust pipes on the truck chassis, such as is depicted in FIG. 8. The fore ports 26 connect to the segments of the passageways 40 that pass along the front wall of the body, thus passing the exhaust fumes through the passageways 40 of the body. As is known in the art, gaskets 37 may be inserted at the point of connection between the exhaust pipes 14A and the fore ports 26 to limit leakage of fumes through the connection. This embodiment shows two fore ports 26 but there may be only one port, or there may be more than two, depending on the chassis and the number of exhaust pipes used in the selected model chassis. If there are more than two fore or aft exhaust pipes on the truck chassis, the exhaust pipes may be merged before introducing the exhaust to the fore (or aft) ports, or additional fore (or aft) ports may be provided on the truck body.

Figure 10:
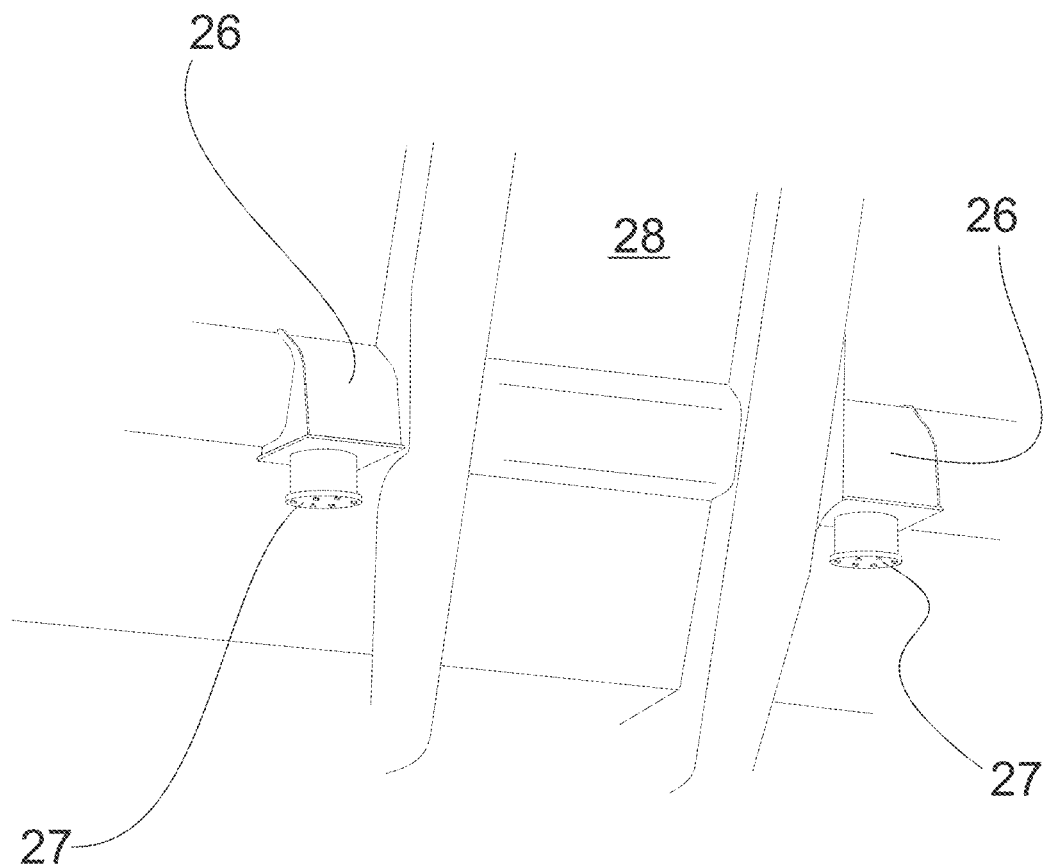
FIG. 10 is a close-up perspective view of the fore input ports of the truck body of FIG. 8 with the ports closed off.

FIG. 10 depicts a close-up perspective bottom view of the front wall 28 of the truck body 12 when the fore ports 26 are not in use (that is, when the aft ports 25 are in use), such as is depicted in FIG. 5. That is, if the chassis 13 has aft exhaust pipes 14, as discussed above, the fore ports 26 are closed off, typically by bolting a plate 27 to each of the fore ports 26.

Analysis of Heating Patterns

Figure 11:
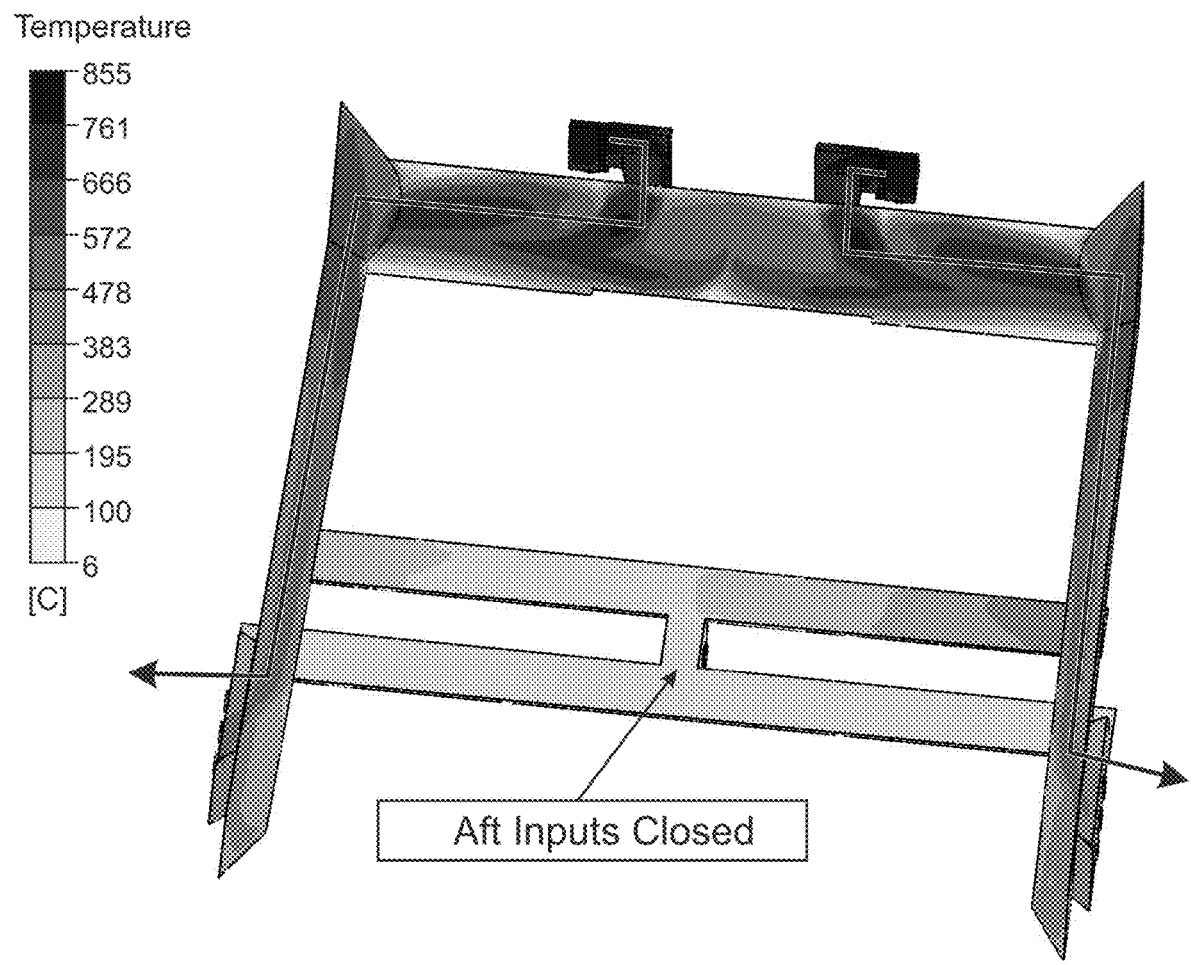
FIG. 11 depicts a schematic view of the heat signature of the truck body of FIG. 8 when exhaust is passing through the truck body from fore ports with the aft ports closed.
Figure 12:
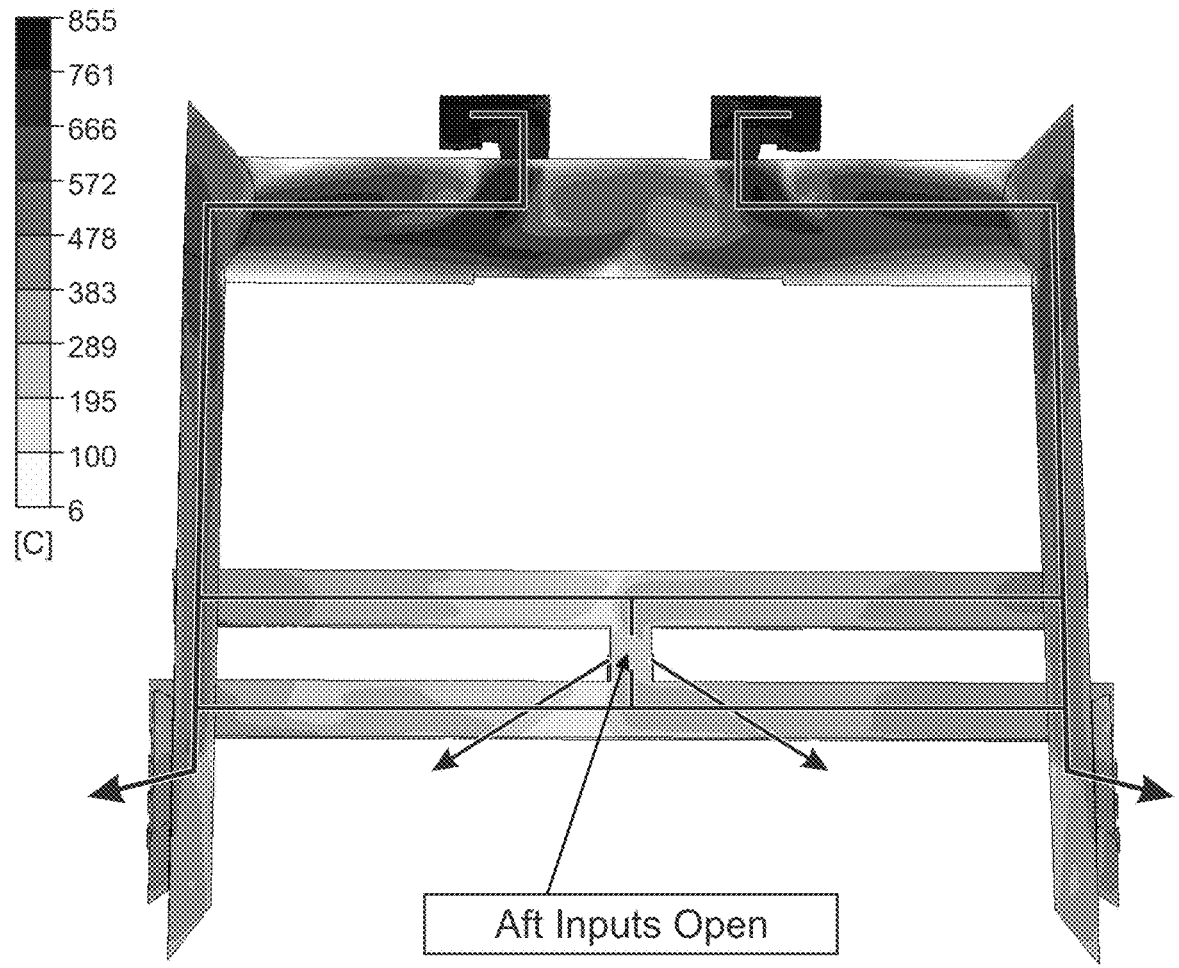
FIG. 12 depicts a schematic view of the heat signature of the truck body of FIG. 8 when exhaust is passing through the truck body from the fore ports with the aft ports open.

FIG. 11 depicts grey-scale images of the wall temperatures created by exhaust flowing from the chassis exhaust into the passageways of one embodiment of a truck body 12 according to the present disclosure, when that body is mounted onto a chassis 13 having fore terminating exhaust pipes 26. FIG. 11 depicts the information when the aft ports 25 are closed during use, and FIG. 12 depicts the information when the aft ports 25 are open during use.

Figure 13:
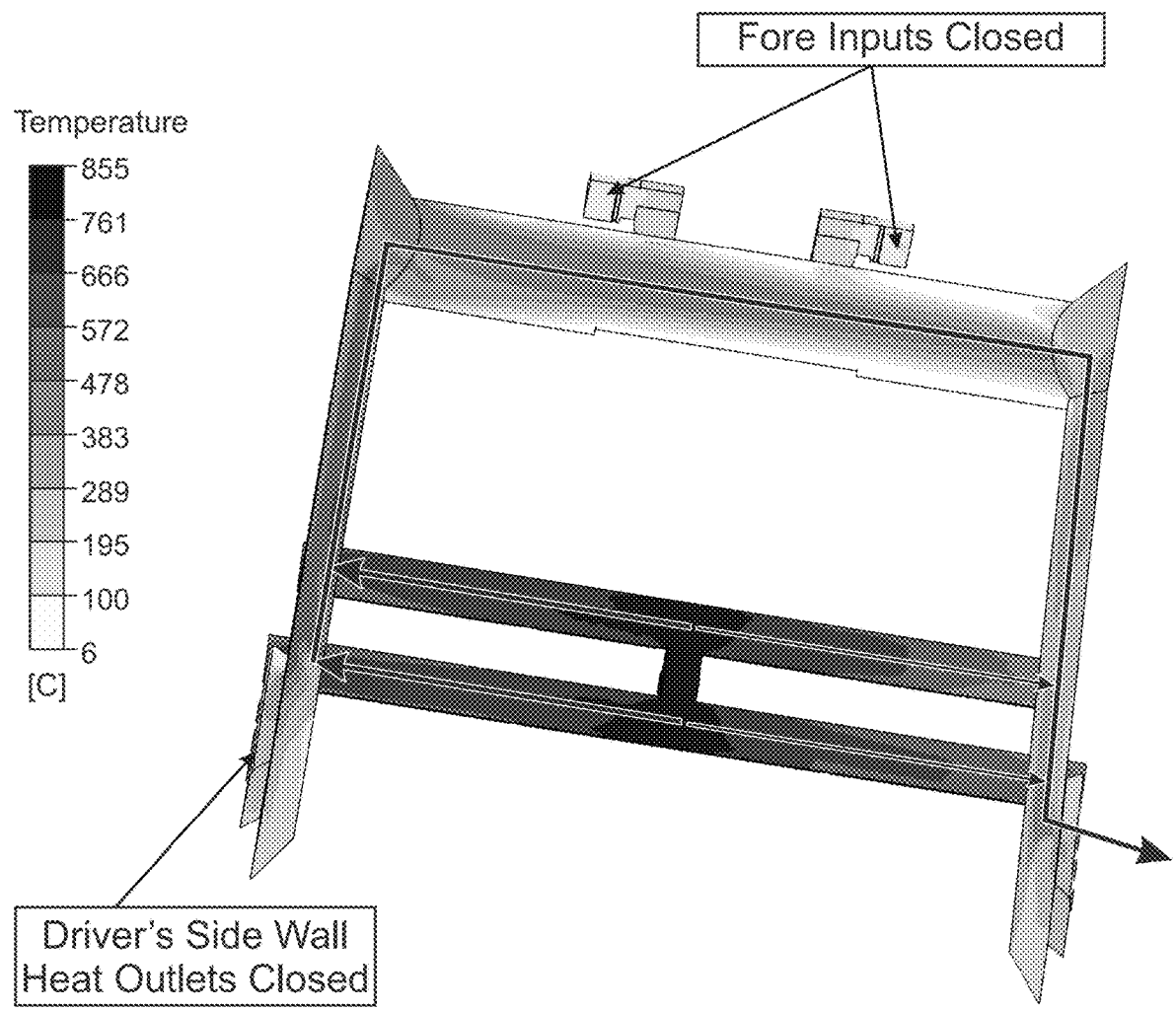
FIG. 13 depicts a schematic view of the heat signature of the truck body of FIG. 5 when exhaust is passing through the truck body from aft ports and with the driver's side heat outlets closed.

Similarly, FIG. 13 depicts wall temperatures created by exhaust flowing through the passageways 40 of a similar embodiment of a truck body 12 according to the present disclosure, when that body is mounted onto a chassis 13 having aft terminating exhaust outputs 30. As can be seen, the truck body 12 of the present disclosure allows the body to be mounted on different chassis 13 (fore exhaust pipes chassis and aft exhaust pipes chassis), and will heat the truck body in such a way as to reduce or eliminate "sticky" material being left in the body after dumping.

Figure 14:
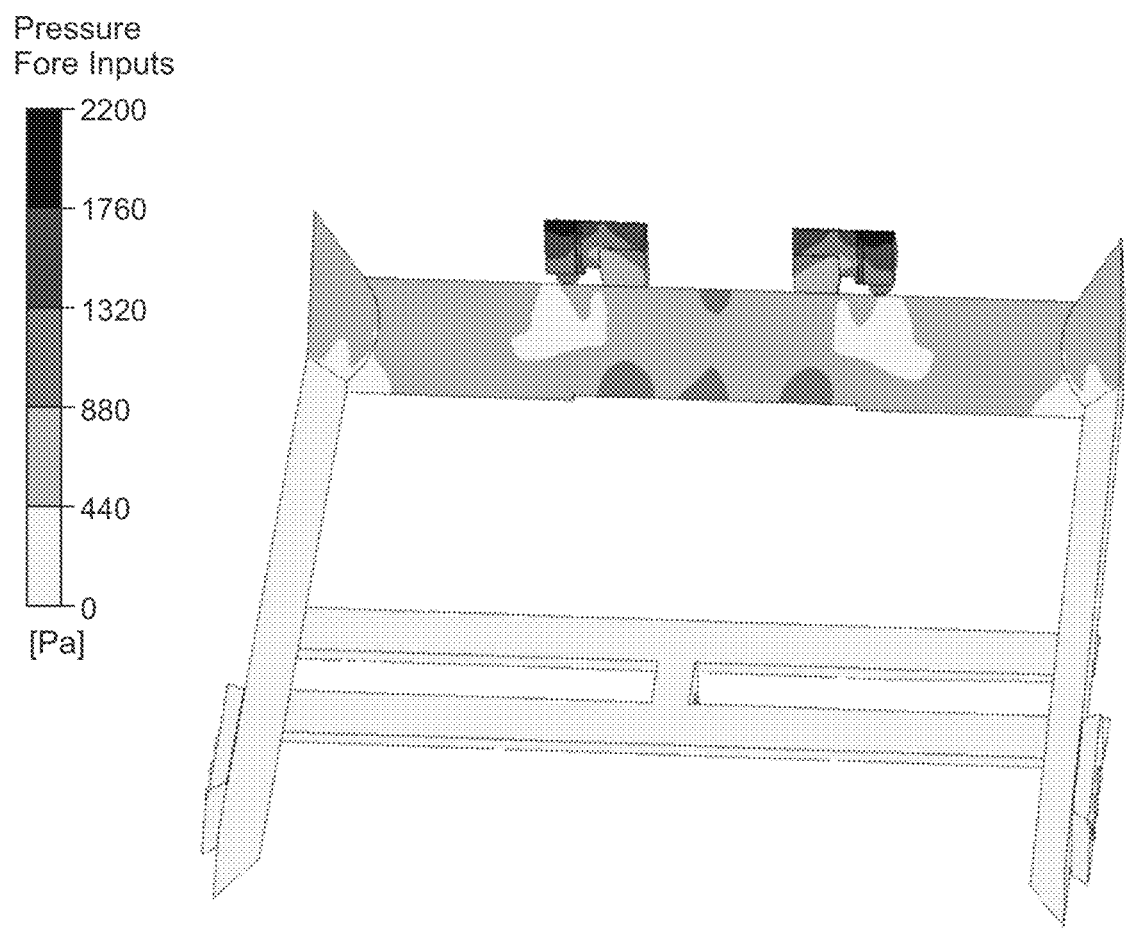
FIG. 14 depicts a schematic view of the pressure signature of the truck body of FIG. 8 when exhaust is passing through the truck body from the fore ports with the aft ports open.
Figure 15:
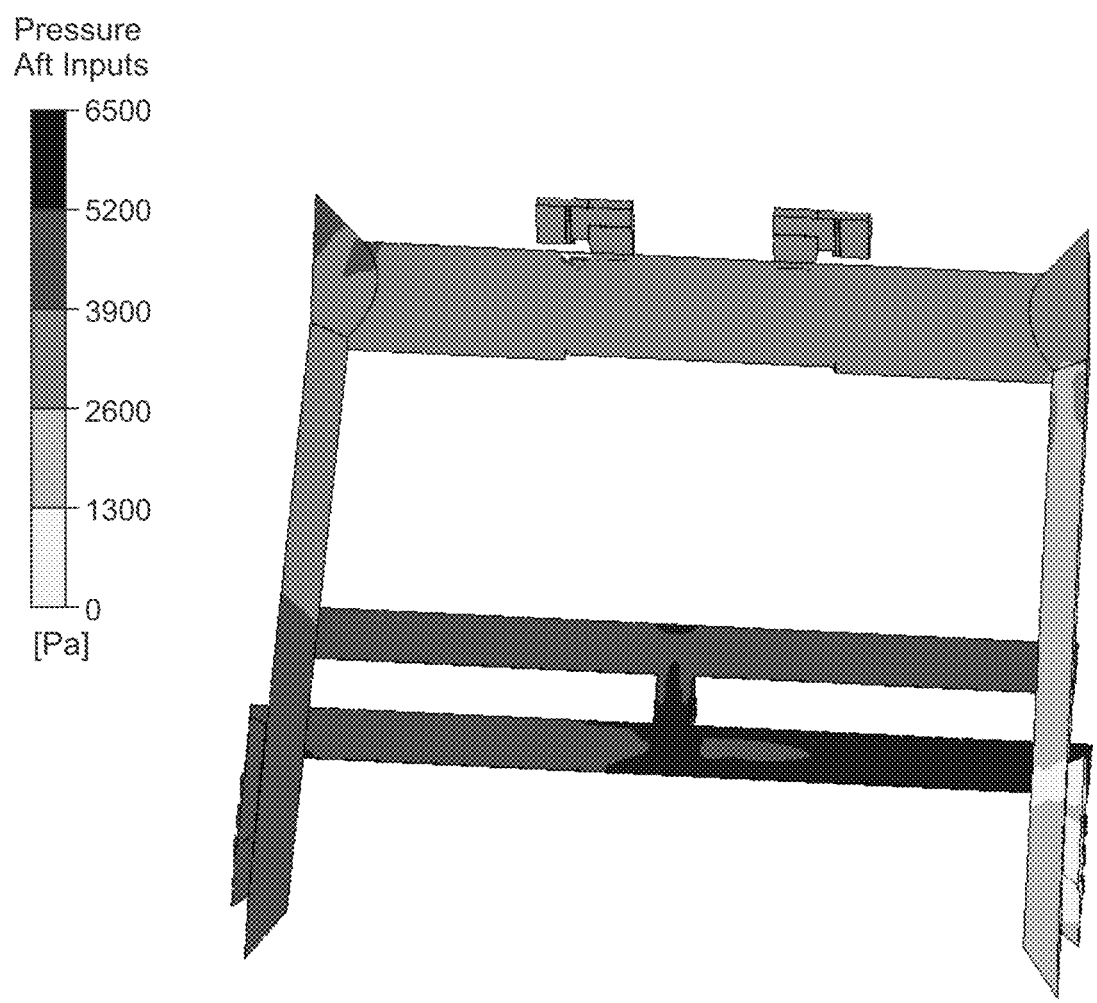
FIG. 15 depicts a schematic view of the pressure signature of the truck body of FIG. 5 when exhaust is passing through the truck body from aft ports and with the driver's side heat outlets closed.

FIG. 14 depicts a grey scale image of the pressures created by exhaust flowing from the chassis exhaust into the passageways 40 of a truck body 12 when that body is mounted onto a chassis 13 having fore terminating exhaust pipes 26 with aft inputs closed. The illustrated truck body corresponds to the truck body shown in FIG. 11. Similarly, FIG. 15 depicts a grey scale image of the pressures created by exhaust flowing through the passageways 40 of a similar embodiment of a truck body 12 according to the present disclosure, when that body is mounted onto a chassis 13 having aft terminating exhaust outputs 30, corresponding to the truck body shown in FIG. 13. Note that the aft exhaust results in greater pressures, but in either case, the inlet and passageways have sufficient cross-sectional area so as to keep the pressures within the allowable limits of the truck engine.

It will be appreciated by those skilled in the art that various truck body designs and configurations exist that meet the functionality requirements of the various truck bodies and truck chassis configurations used in the industry. For example, the Figures depict a truck body for use on a Komatsu 980E chassis. Given the above disclosure, those skilled in the art will understand that the passageways 40 and the ports may be varied to accommodate various truck bodies, chassis, and engines, for example by altering the paths taken by the passageways 40, the cross-sectional areas of the passageways 40, specific locations of the fore and aft ports, bellows and connectors employed to connect the passageways 40 to the exhaust ports of the chassis. Thus, although particular embodiments of the present invention have been described, those of skill in the art will appreciate that various modifications and changes may be made by those skilled in the art without departing from the inventive concept or concepts described herein. The present invention may be embodied in other specific forms without departing from its structures, methods, or other essential characteristics as broadly described herein and claimed hereinafter. The described embodiments are to be considered in all respects only as illustrative, and not restrictive.

The invention claimed is:

1. A truck body adapted to be mounted on a truck chassis for use in transporting material, the body having a front wall, opposed first and second side walls, and a floor, the body being mountable to a truck chassis at pivot points under the body, the body comprising:

an aft exhaust port mounted proximate the floor and adapted to pass heated vehicle exhaust entering from an aft exhaust pipe of a vehicle when the aft exhaust pipe is connected to the aft exhaust port through passageways formed in or attached to at least one of the floor, the front wall, and the opposed side walls that will cause the heated vehicle exhaust to pass along and thereby heat at least a portion of at least one of the floor, the front wall, and the side walls;

a fore exhaust port mounted in or proximate to the front wall and adapted to pass heated vehicle exhaust entering from a fore exhaust pipe of a vehicle when the fore exhaust pipe is connected to the fore exhaust port through passageways in the front wall, floor, and the opposed side walls that will cause the heated vehicle exhaust to pass along and thereby heat at least a portion of at least one of the front wall, floor, and the side walls; and a first aft exhaust port formed in or proximate to the first side wall and a second aft exhaust port formed in or proximate to the second side wall, both of the exhaust ports being adapted to permit vehicle exhaust to pass out of the passageways.

2. The truck body of claim 1 further comprising:

a first plate for covering the fore exhaust port when vehicle exhaust enters the passageways through the aft exhaust port; and a second plate for covering the aft exhaust port when vehicle exhaust enters the passageways through the fore exhaust port.

3. A truck body adapted to be mounted on a truck chassis for use in transporting material, the body having a front wall, opposed first and second side walls, and a floor, the body being mountable to a truck chassis at pivot points under the body, the body comprising:

an aft exhaust port adapted to pass heated vehicle exhaust entering from an aft exhaust pipe of a vehicle when connected to the aft exhaust port through passageways that will cause the heated vehicle exhaust to pass along and thereby heat at least a portion of at least one of the floor, the front wall, and the side walls;

a fore exhaust port entering from a fore exhaust pipe of a vehicle when connected to the fore exhaust port adapted to pass heated vehicle exhaust through the passageways and thereby heat at least a portion of at least one of the front wall, floor, and the side walls; and a first aft exhaust port and a second aft exhaust port, both of the exhaust ports being adapted to permit vehicle exhaust to pass out of the passageways.

4. The truck body of claim 3 further comprising:

a first plate for covering the fore exhaust port when vehicle exhaust enters the passageways through the aft exhaust port; and a second plate for covering the aft exhaust port when vehicle exhaust enters the passageways through the fore exhaust port.

5. The truck body of claim 3 in which the passageways are formed in or attached to at least one of the floor, the front wall, and the opposed side walls.

6. The truck body of claim 3 in which the passageways are adapted to pass heated vehicle exhaust through or along at least one of the front wall, floor, and opposed side walls of the truck body.

7. A truck body adapted to be mounted on a truck chassis for use in transporting material, the body having a front wall, opposed first and second side walls, and a floor, the body being mountable to a truck chassis with at least one pivot point under the body, the body comprising:

at least one fore exhaust port provided at the front wall;

at least one aft exhaust port provided on at least one of the first and second side walls;

at least one aft port provided on an underside of the truck body; and passageways interconnecting the at least one fore exhaust port, the at least one aft exhaust port, and the at least one aft port;

each of the at least one fore exhaust port and the at least one aft exhaust port being selectively closeable to direct the flow of heated vehicle exhaust from the at least one fore exhaust port or the at least one aft exhaust port through a predetermined set of the passageways to heat one or more of the front wall, at least one of the side walls, and the floor of the truck body.

8. The truck body of claim 7 comprising at least one aft exhaust port provided on each of the first and second side walls.

9. The truck body of claim 8 comprising a fore exhaust port corresponding to each of the aft exhaust ports.

10. The truck body of claim 9 wherein the passageways comprise a first passageway connecting a first one of the fore exhaust ports to the aft exhaust port provided on the first side wall and a second passageway connecting a second one of the fore exhaust ports to the aft exhaust port provided on the second side wall.

11. The truck body of claim 10 wherein the passageways comprise passageways connecting the first passageway to the at least one aft port and connecting the second passageway to the at least one aft port, respectively.

12. The truck body of claim 11 wherein the passageways connecting the first and second passageways to the at least one aft port run laterally across the truck body.

13. The truck body of claim 7 comprising a plurality of aft ports provided on the underside of the truck body.

14. The truck body of claim 7 wherein the passageways are formed in the front wall, first and second side walls, and floor of the truck body.

15. The truck body of claim 7 wherein at least a portion of the passageways comprise piping mounted to the truck body.

* * * * *